(12) United States Patent
Matsumoto et al.

(10) Patent No.: US 12,434,619 B2
(45) Date of Patent: *Oct. 7, 2025

(54) BRACKET ATTACHMENT STRUCTURE

(71) Applicants: STANLEY ELECTRIC CO., LTD., Tokyo (JP); HONDA MOTOR CO., LTD., Tokyo (JP)

(72) Inventors: Takehiro Matsumoto, Tokyo (JP); Yuki Sasanuma, Tokyo (JP); Takato Watanabe, Tokyo (JP); Keishi Shiomi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/785,907

(22) Filed: Jul. 26, 2024

(65) Prior Publication Data

US 2025/0033554 A1    Jan. 30, 2025

(30) Foreign Application Priority Data

Jul. 28, 2023    (JP) .................................. 2023-123023

(51) Int. Cl.
*B60Q 1/00* (2006.01)
*G01S 7/02* (2006.01)

(52) U.S. Cl.
CPC ............ *B60Q 1/0023* (2013.01); *G01S 7/027* (2021.05)

(58) Field of Classification Search
CPC .................................................. B60Q 1/0023
See application file for complete search history.

(56) References Cited

FOREIGN PATENT DOCUMENTS

JP    2022-001451 A    1/2022

*Primary Examiner* — Robert J May
(74) *Attorney, Agent, or Firm* — KENEALY VAIDYA LLP (57) ABSTRACT

Provided is a bracket attachment structure for detachably attaching a bracket to which a radar unit is attached to an outer lens. In the bracket attachment structure, the outer lens is attached to a lamp housing and constitutes a lamp chamber in which a lamp unit is disposed between the outer lens and the lamp housing, the outer lens includes a recessed part and an engaged part formed on an inner wall of the recessed part, and the bracket includes a bracket main body disposed in the recessed part, an engaging part provided on the bracket main body and inserted into the engaged part, an extension part extending to an outside of the recessed part and detachably fixed to an attachment partner, and at least one spring part disposed between the rear surface of the bracket main body and a bottom surface of the recessed part.

6 Claims, 11 Drawing Sheets

BRACKET ATTACHMENT STRUCTURE

INCORPORATION BY REFERENCE

This application is based upon and claims the benefit of priority from Japanese patent application No. 2023-123023, filed on Jul. 28, 2023, the disclosure of which is incorporated herein in its entirety by reference.

BACKGROUND

The present disclosure relates to a bracket attachment structure for detachably attaching a bracket to which a radar unit is attached to an outer lens.

Patent Literature 1 describes a bracket attachment structure in which a bracket (support member) to which a radar unit is attached is detachably attached to a housing (in particular, refer to FIG. 2 of Patent Literature 1). The radar unit is used to detect an object by transmitting a high-frequency electromagnetic wave (for example, millimeter waves) around the vehicle and receiving a reflected wave from the object present within a transmission range.

Patent Literature 1: Japanese Unexamined Patent Application Publication No. 2022-001451.

SUMMARY

However, Patent Literature 1 does not describe or suggest a bracket attachment structure for detachably attaching the bracket (support member) to which the radar unit is attached to the outer lens, and there is room for improvement.

The present disclosure has been made to solve such a problem, and an example object thereof is to provide a bracket attachment structure for detachably attaching a bracket to which a radar unit is attached to an outer lens.

In an example aspect, a bracket attachment structure according to the present disclosure is a bracket attachment structure that detachably attaches a bracket to an outer lens that is attached to a lamp housing and constitutes a lamp chamber in which a lamp unit is disposed between the outer lens and the lamp housing, the outer lens includes a recessed part recessed toward the lamp housing side, the bracket includes a bracket main body including a front surface to which a radar unit is detachably attached and a rear surface on a side opposite to a the front surface, the bracket main body being disposed in the recessed part in a state where the rear surface and a bottom surface of the recessed part face each other, an extension part extending from an other end side on a side opposite to one end side of the bracket main body to an outside of the recessed part and detachably fixed to an attachment partner, and at least one spring part arranged between the rear surface of the bracket main body and the bottom surface of the recessed part, an engaged part is provided in one of an inner wall of the recessed part and the one end side of the bracket main body, an engaging part that engages with the engaged part is provided in the other of the inner wall of the recessed part and the one end side of the bracket main body, the spring part is elastically deformed by being biased toward the bracket main body by the bottom surface of the recessed part in a state where the engaging part is engaged with the engaged part and the extension part is detachably fixed to the attachment partner, and the engaging part is engaged with the engaged part by a reaction force of the elastically deformed spring part.

With such a configuration, it is possible to provide the bracket attachment structure in which the bracket to which the radar unit is attached is detachably attached to the outer lens.

This is because an engaging part engaged with the engaged part by the reaction force of the elastically deformed spring part and the extension part extending from the other end side of the bracket main body to the outside of the recessed part and detachably fixed to the attachment partner are provided. As a result, the bracket attachment structure in which a positional shift of the bracket with respect to the outer lens is less likely to occur even when vibration (vibration mainly during running of vehicle) is applied is realized.

In the bracket attachment structure, the spring part may be formed integrally with the bracket main body by forming, in the bracket main body, a U-shaped through hole penetrating the front surface and the rear surface.

In the bracket attachment structure, the extension part may be configured to be elastically deformed in a state where the engaging part is engaged with the engaged part and the extension part is detachably fixed to the attachment partner, and the engaging part may engage with the engaged part by the reaction force of the elastically deformed spring part and a reaction force of the elastically deformed extension part.

In this way, by the reaction force of the elastically deformed extension part, the engaging part is further biased to the inner wall of the engaged part and is fixed in a state of being more firmly locked. As a result, a bracket attachment structure in which the positional shift of the bracket with respect to the outer lens is further unlikely to occur even when vibration (vibration mainly during running of vehicle) is applied is realized.

In the bracket attachment structure, the extension part may include a curved part having a U-shaped cross section.

In the bracket attachment structure, the bracket main body, the engaging part, the extension part, and the spring part may be integrally molded using a synthetic resin having a spring property.

In the bracket attachment structure, the engaged part may be a groove, the engaging part may be a protruding part to be inserted into the groove, and the protruding part may be fixed in a state of being biased and locked to the groove inner wall by a reaction force of the elastically deformed spring part.

According to the present disclosure, it is possible to provide the bracket attachment structure in which the bracket to which the radar unit is attached is detachably attached to the outer lens.

The above and other objects, features and advantages of the present disclosure will become more fully understood from the detailed description given hereinbelow and the accompanying drawings.

DESCRIPTION OF EMBODIMENTS

Hereinafter, a vehicle lamp to which a bracket attachment structure according to an embodiment of the present disclosure is applied will be described with reference to the accompanying drawings. In the drawings, corresponding components are denoted by the same reference numerals, and repeated descriptions are omitted.

The vehicle lamp fitting 10 of the present embodiment is a vehicle lamp functioning as a headlamp, and is mounted on both left and right sides of a front end of a vehicle (not illustrated) such as an automobile. Since the vehicle lamp fitting 10 mounted on both the left and right sides has a symmetrical configuration, the vehicle lamp fitting 10 mounted on the left side (the left side when viewed from the front of the vehicle) of the front end of the vehicle will be described below as a representative.

Figure 1:
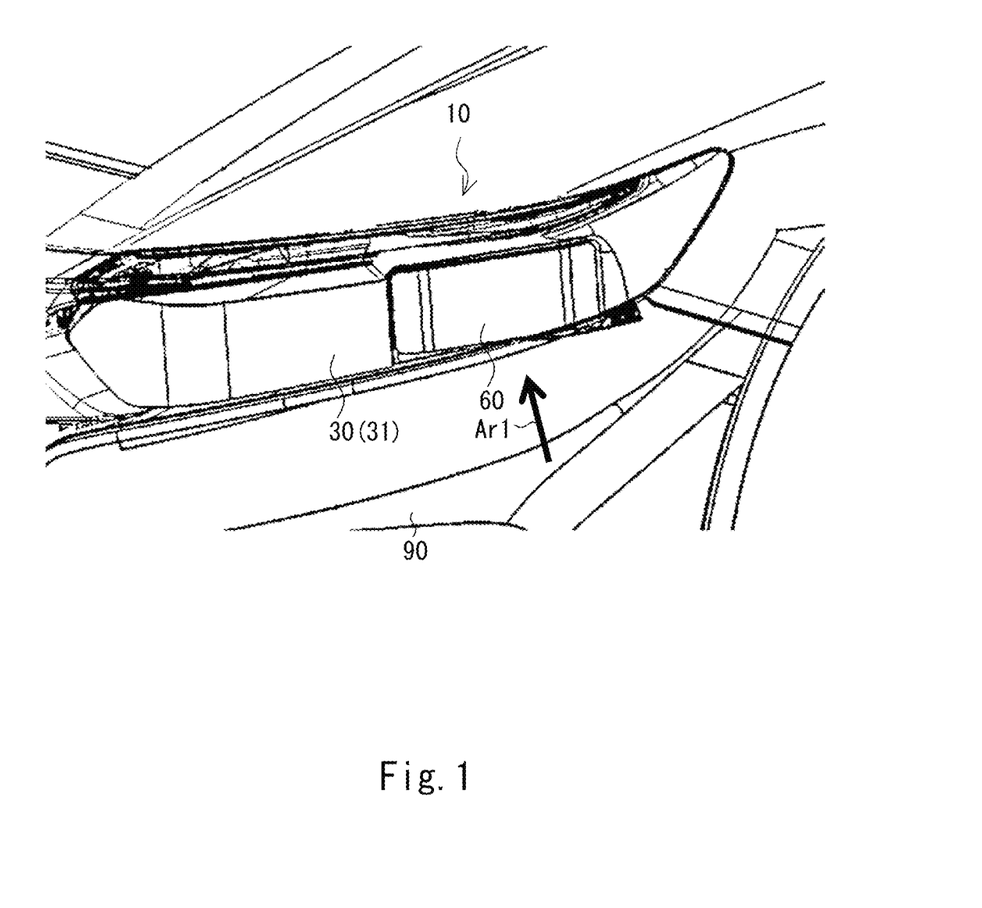
FIG. 1 is a perspective view of the vicinity of a vehicle lamp fitting 10 mounted on a vehicle.
Figure 2:
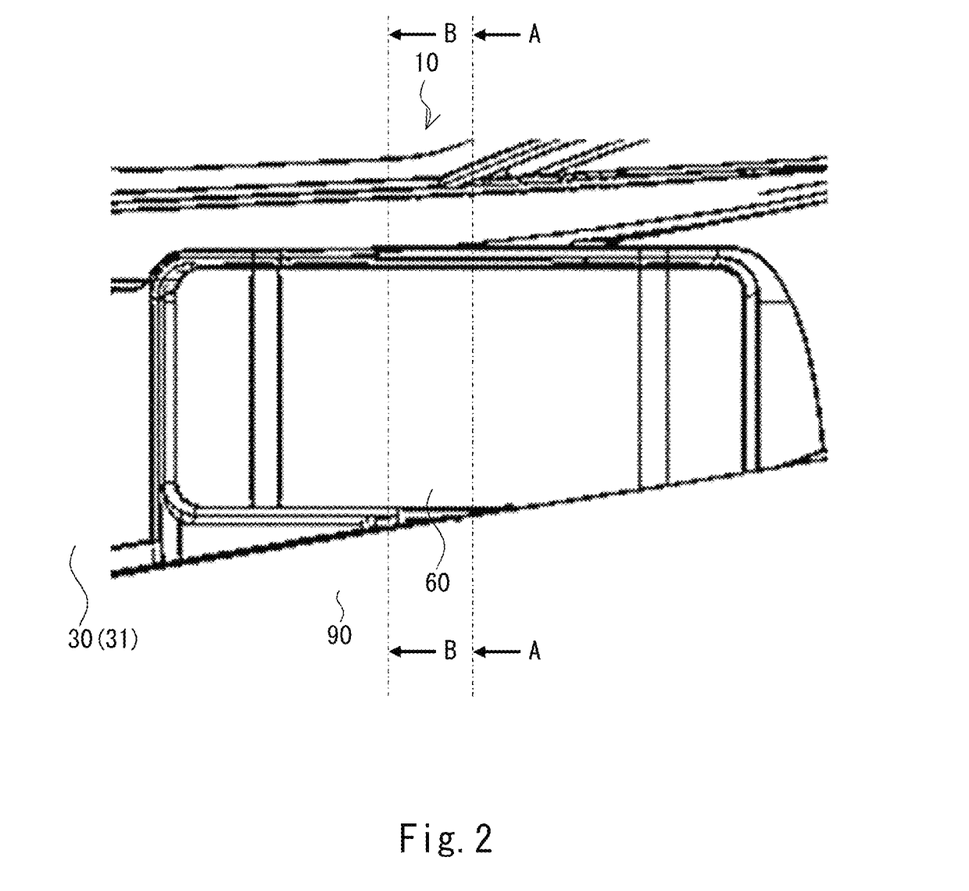
FIG. 2 is a view as viewed in a direction of an arrow Ar1 in FIG. 1.
Figure 3:
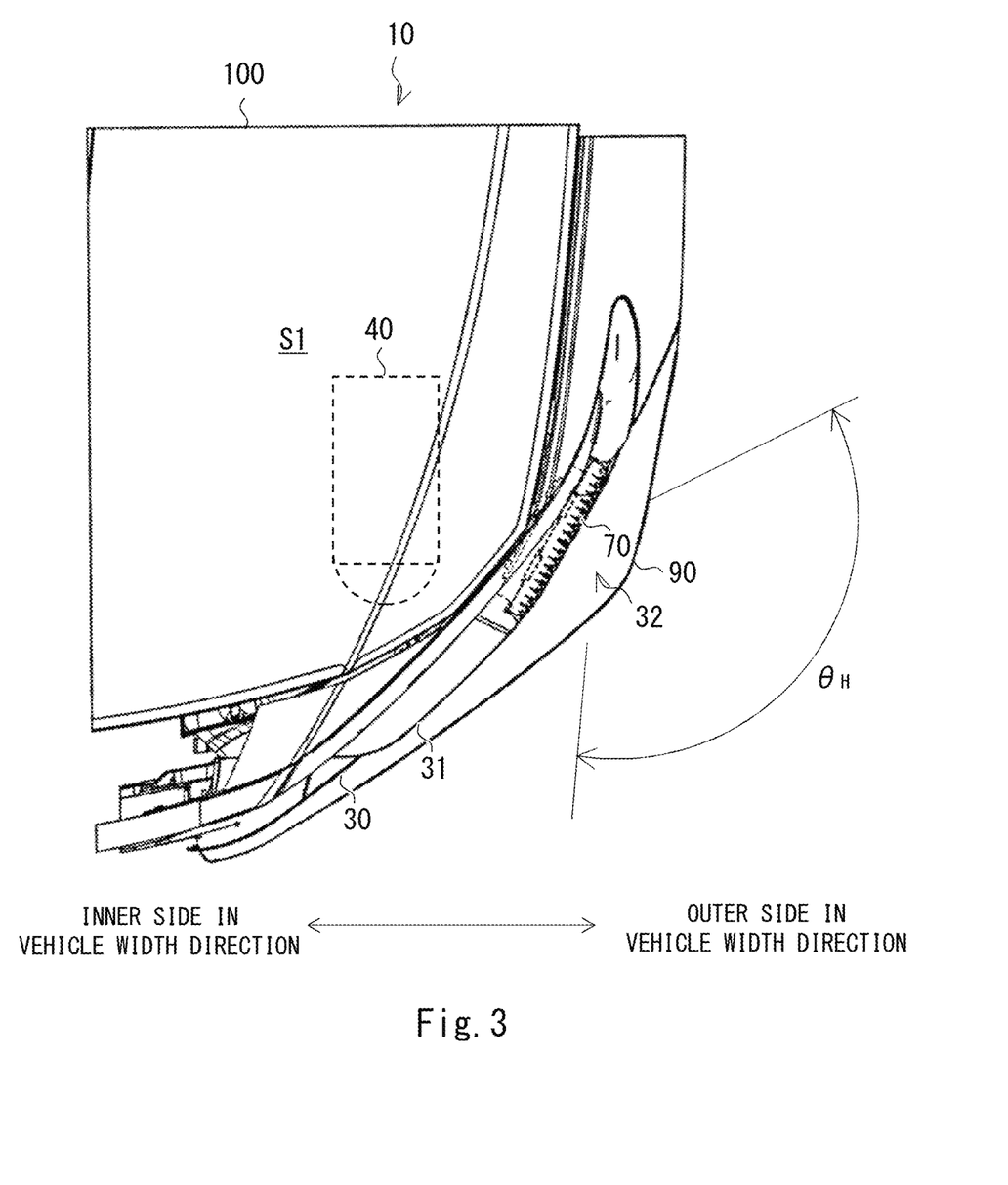
FIG. 3 is a top view of the vehicle lamp fitting 10.
Figure 4:
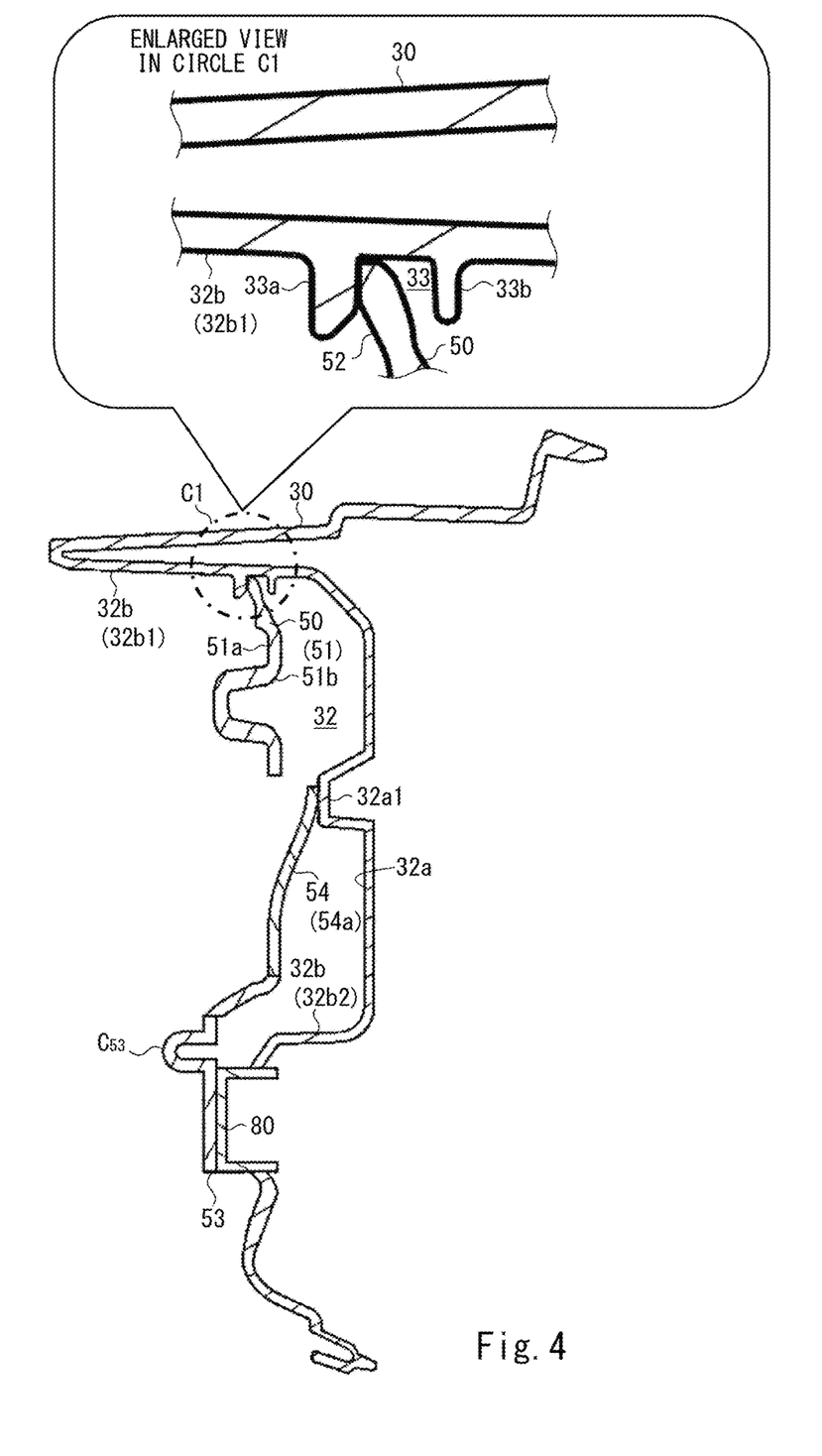
FIG. 4 is a cross-sectional view taken along line A-A of FIG. 2.
Figure 5:
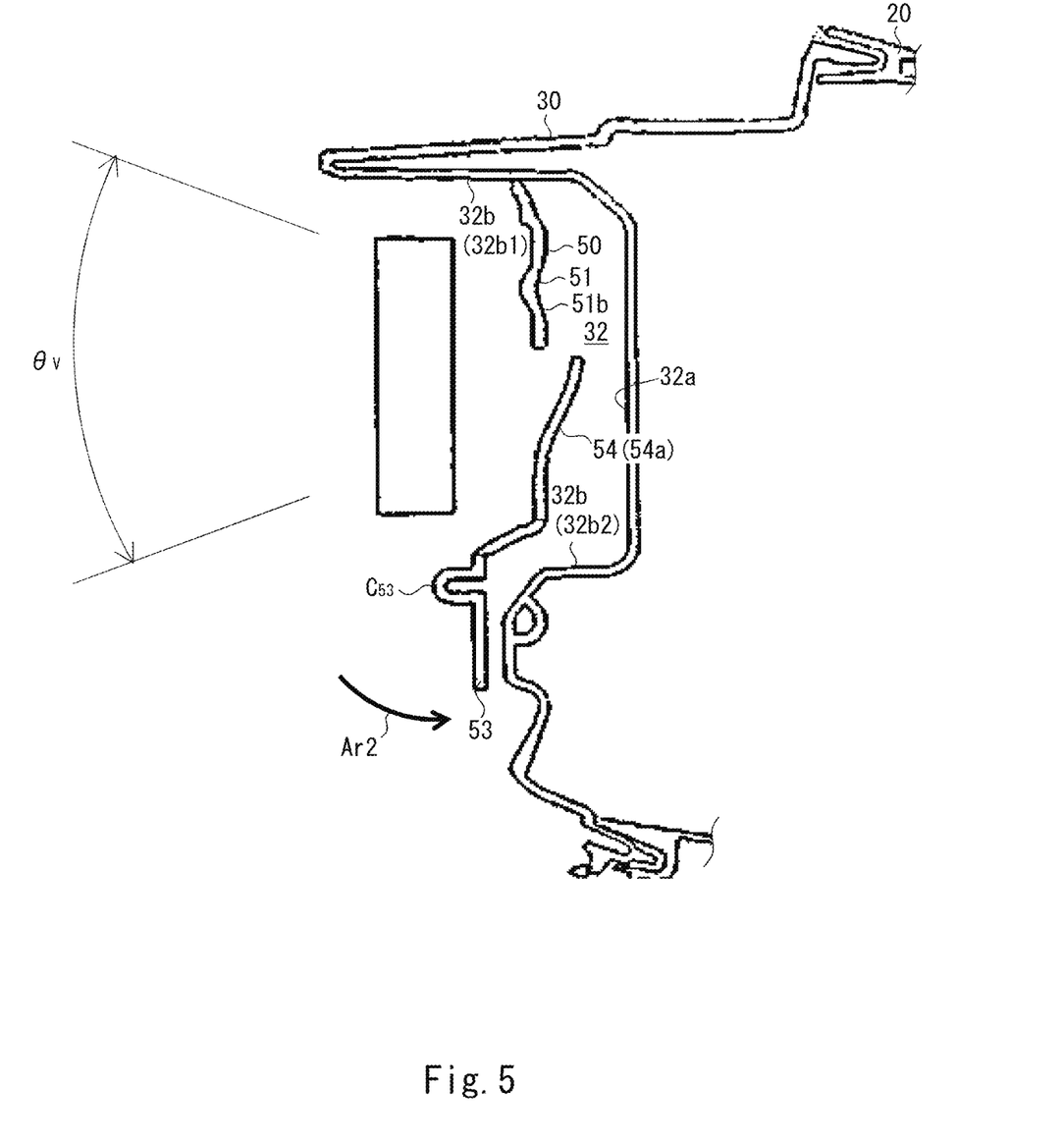
FIG. 5 is a cross-sectional view taken along line B-B of FIG. 2.
Figure 6:
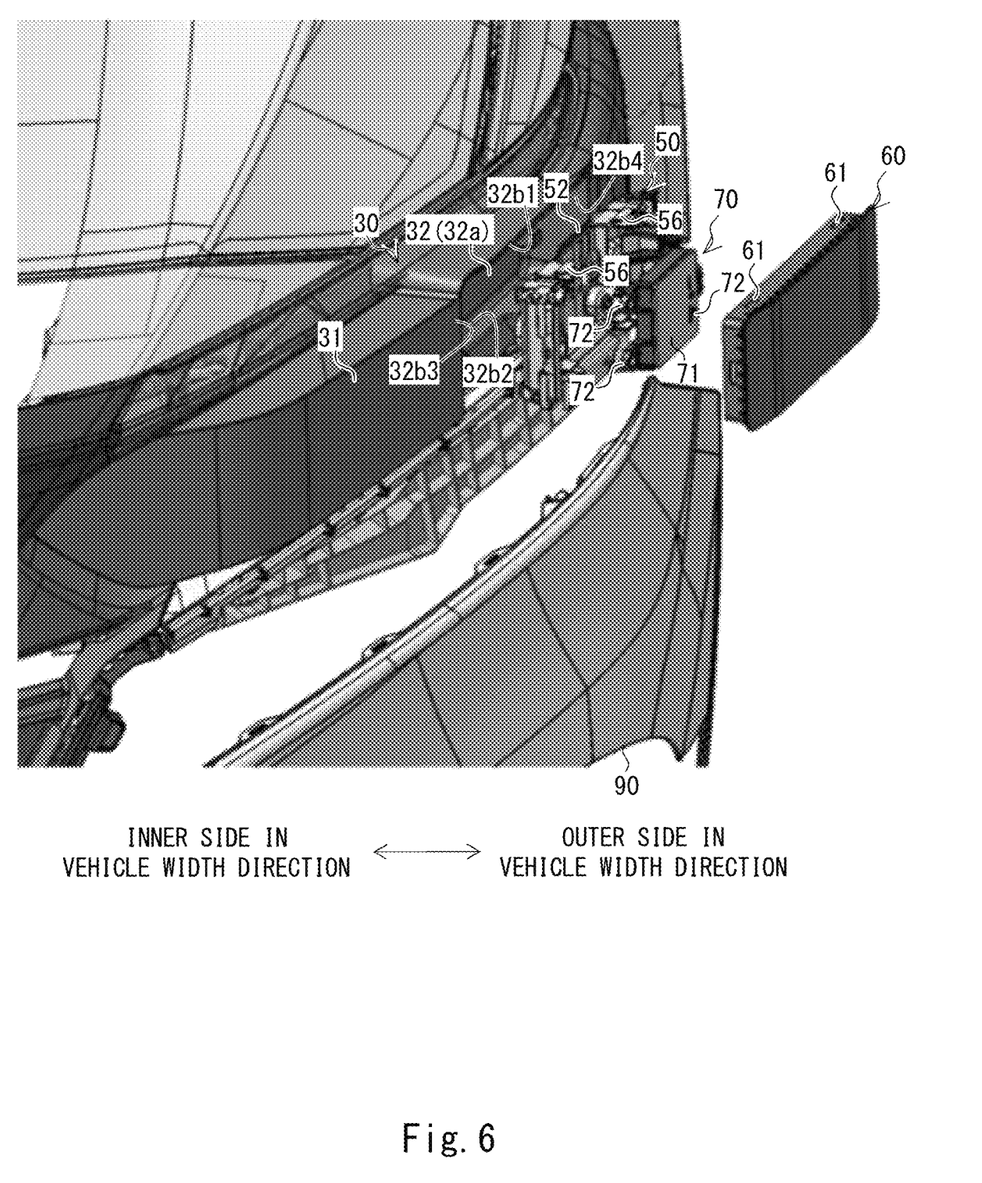
FIG. 6 is an exploded perspective view of the vehicle lamp fitting 10.

FIG. 1 is a perspective view of the vicinity of a vehicle lamp fitting 10 mounted on a vehicle, FIG. 2 is a view as viewed from a direction of an arrow Ar1 in FIG. 1, FIG. 3 is a top view of the vehicle lamp fitting 10, FIG. 4 is a cross-sectional view taken along line A-A of FIG. 2, FIG. 5 is a cross-sectional view taken along line B-B of FIG. 2, and FIG. 6 is an exploded perspective view of the vehicle lamp fitting 10.

As illustrated in FIGS. 3 to 6, the vehicle lamp fitting 10 includes a lamp housing 20 (see FIG. 5), an outer lens 30, a lamp unit 40, a bracket 50, a radar cover 60, and a radar unit 70. Note that a reference numeral 90 in FIGS. 1 and 6 represents a bumper. A reference numeral 100 in FIG. 3 represents a vehicle body.

The outer lens 30 is attached to the lamp housing 20, and constitutes a lamp chamber in which the lamp unit 40 is arranged between the outer lens and the lamp housing 20. The lamp unit 40 may have any configuration as long as it is a lamp unit that emits light functioning as a headlamp. For example, the lamp unit 40 may be a projector type lamp unit, a reflector type lamp unit, a direct projection type (direct type) lamp unit, a lamp unit using a light guide body (light guide rod, light guide plate), or may be a lamp unit other than these.

The outer lens 30 is made of a transparent resin (synthetic resin) such as acrylic or polycarbonate, and includes a lens part 31 through which light emitted from the lamp unit 40 passes, a recessed part 32 recessed from the front side toward the rear side (lamp housing 20 side), and a groove 33 (see an enlarged view in a circle C1 in FIG. 4) formed in an inner wall 32b (upper inner wall 32b1) of the recessed part 32. The groove 33 is an example of an engaged part of the present disclosure.

The lens part 31 is disposed at an inner side in a vehicle width direction, and the recessed part 32 is disposed at an outer side in the vehicle width direction (see FIG. 3). The recessed part 32 includes a bottom surface 32a on the rear side and an inner wall 32b (upper inner wall 32b1, lower inner wall 32b2, inner inner wall 32b3, and outer inner wall 32b4) (see FIGS. 4 and 6).

Figure 7:
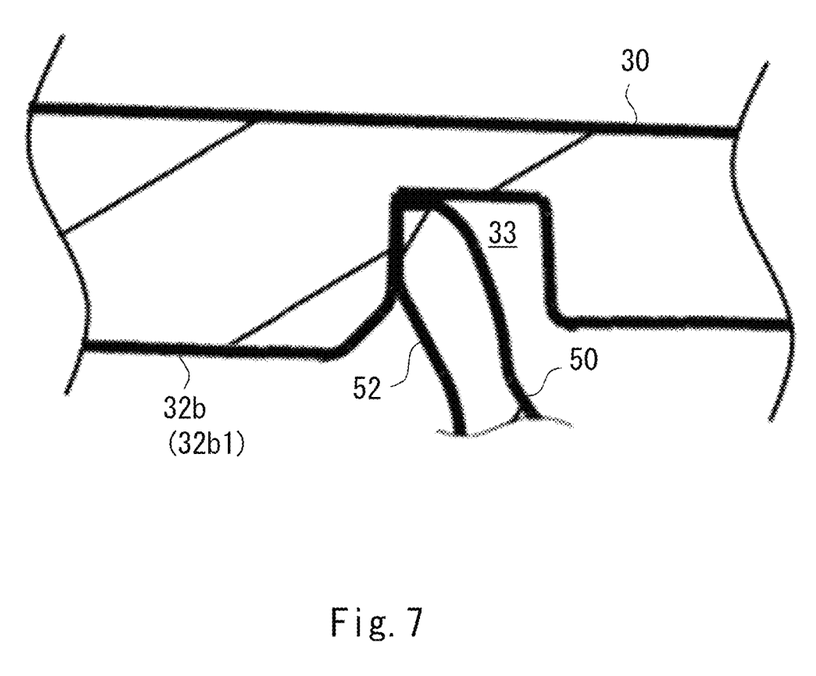
FIG. 7 is a modified example of a groove 33.

The groove 33 is a groove into which a protruding part 52 provided on the upper side of the bracket 50 (bracket main body 51) is inserted. The groove 33 is formed in the inner wall 32b (upper inner wall 32b1) of the recessed part 32 (see an enlarged view in a circle C1 in FIG. 4). Specifically, the groove 33 is formed between the first protruding part 33a on the front surface side and the second protruding part 33b on the rear surface side protruding from the inner wall 32b (upper inner wall 32b1). The groove 33 extends in a direction orthogonal to the paper surface in FIG. 4. As illustrated in FIG. 7, the groove 33 may be formed directly on the inner wall 32b (upper inner wall 32b1) of the recessed part 32. FIG. 7 is a modified example of the groove 33.

Next, the bracket 50 will be described.

Figure 8:
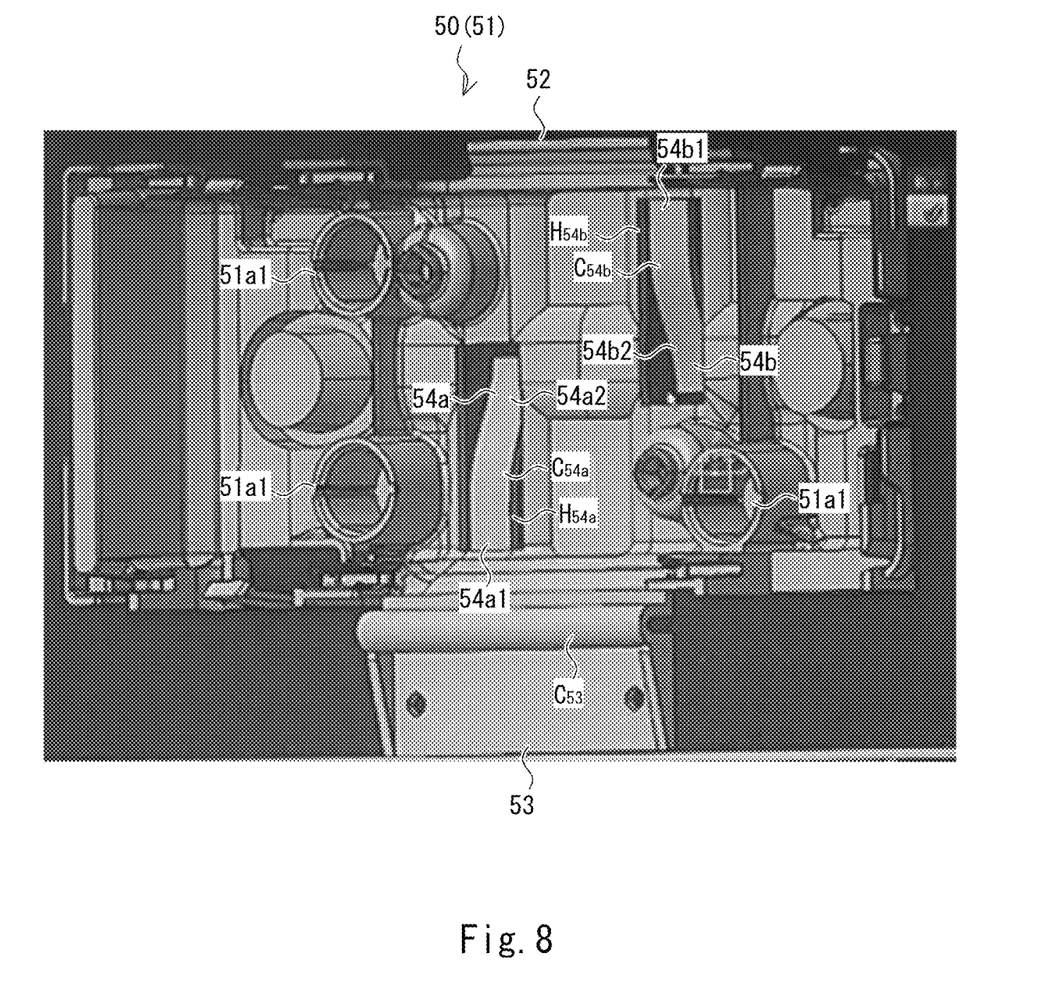
FIG. 8 is a perspective view of a bracket 50.
Figure 9A:
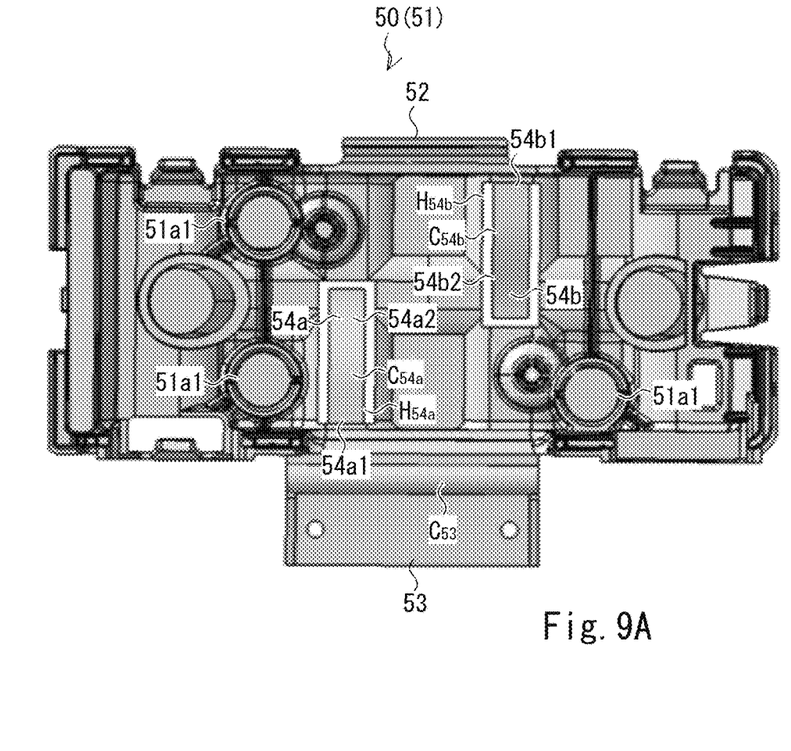
FIG. 9A is a front view of the bracket 50.
Figure 9B:
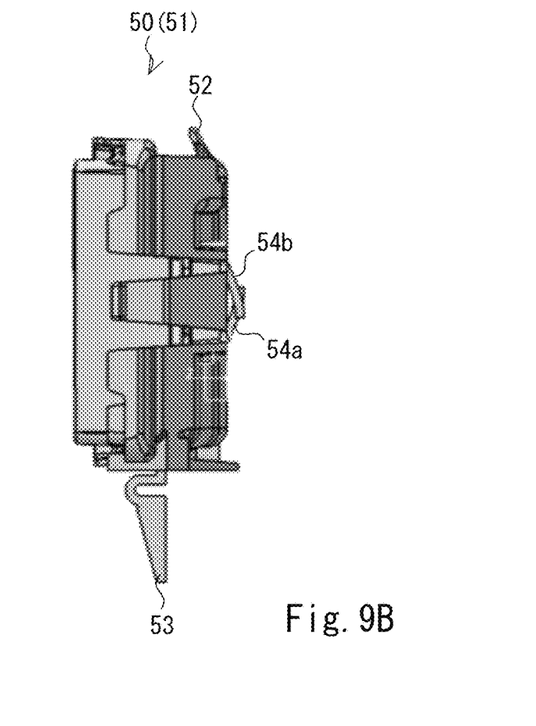
FIG. 9B is a side view of the bracket 50.

FIG. 8 is a perspective view of the bracket 50, FIG. 9A is a front view, and FIG. 9B is a side view.

As illustrated in FIGS. 8 and 9, the bracket 50 includes a bracket main body 51, a protruding part 52, an extension part 53, and a spring part (first spring part) 54 (54a and 54b). The bracket 50 is integrally formed of a spring-like synthetic resin such as polycarbonate (PC), polybutylene terephthalate (PBT), or polyoxymethylene (POS).

The bracket main body 51 includes a radar unit attachment surface 51a (front surface) and a rear surface 51b opposite to the front surface (see FIG. 4). The radar unit attachment surface 51a is provided with screw bosses 51a1 (three locations) to which the radar unit 70 is screwed (see FIGS. 8 and 9A).

The protruding part 52 is provided on the upper side (an example of one end side of the present disclosure) of the bracket main body 51. The protruding part 52 is inserted into the groove 33 formed in the inner wall 32b (upper inner wall 32b1) of the recessed part 32, and is fixed in a state of being biased and locked to the first protruding part 33a (inner wall of the groove 33) (see an enlarged view in a circle C1 in FIG. 4). This point will be further described later. The protruding part 52 is an example of an engaging part of the present disclosure.

The extension part 53 is provided on a lower side (an example of the other end side of the present disclosure) opposite to the upper side of the bracket main body 51. As illustrated in FIG. 4, the extension part 53 extends downward from the lower side of the bracket main body 51 via the elastically deformable U-shaped curved part $C_{53}$ (second spring part) and is detachably fixed (for example, screw fixing) to an attachment partner 80 outside the recessed part 32. The attachment partner 80 is the lamp housing 20 or the outer lens 30. Note that the elastically deformable U-shaped curved part $C_{53}$ (second spring part) may be omitted.

The spring part 54 (54a and 54b) is disposed between the rear surface 51b of the bracket main body 51 and the bottom surface 32a of the recessed part 32 (see FIG. 5). Note that at least one spring part 54 may be provided. The spring part 54 (54a and 54b) is formed integrally with the bracket main body 51 by forming, in the bracket main body 51, U-shaped through holes $H_{54a}$ and $H_{54b}$ (see FIGS. 8 and 9A) penetrating the radar unit attachment surface 51a and the rear surface 51b on side opposite to the radar unit attachment surface.

Specifically, the spring part 54a includes a fixing part 54a1 fixed to the bracket main body 51, and an extension part 54a2 extending upward from the fixing part 54a1 and extending upward toward the bottom surface 32a side of the recessed part 32 via a curved part $C_{54a}$. Similarly, the spring part 54b includes a fixing part 54b1 fixed to the bracket main body 51 and an extension part 54b2 extending downward from the fixing part 54b1 and extending downward toward the bottom surface 32a side of the recessed part 32 via a curved part $C_{54b}$. The spring part 54 (54a and 54b) is elastically deformed in a state where the extension part 53 is fixed to the attachment partner 80. This point will be further described later.

The bracket 50 having the above configuration is detachably attached to the outer lens 30 (recessed part 32). Specifically, first, in a state where the rear surface of the bracket 50 and the bottom surface 32*a* of the recessed part 32 of the outer lens 30 face each other, the protruding part 52 formed on the upper side of the bracket main body 51 is inserted into and engaged with the groove 33 formed in the inner wall 32*b* (upper inner wall 32*b*1) of the recessed part 32. For example, the protruding part 52 is brought into contact with the inner wall of the groove 33 (see an enlarged view in a circle C1 in FIG. 4). Next, the bracket 50 (bracket main body 51) is rotated in the direction of arrow Ar2 (see FIG. 5) with the inserted and engaged protruding part 52 as a fulcrum. As a result, the spring part 54 (54*a* and 54*b*) is brought into the bottom surface 32*a* of the recessed part 32 (convex part 32*a*1 provided on the bottom surface 32*a* of the recessed part 32 and protruding toward the bracket 50, see FIG. 4), and further, while elastically deforming the spring part 54 (54*a* and 54*b*) and the extension part 53 (curved part $C_{54a}$), the extension part 53 provided on the lower portion side of the bracket 50 is brought close to the attachment partner 80 and fixed (for example, screw fixing) to the attachment partner 80.

In a state where the protruding part 52 is inserted into the groove 33 and the extension part 53 is detachably fixed to the attachment partner 80 as described above, the spring part 54 (54*a* and 54*b*) is biased to the bracket main body 51 side by the bottom surface 32*a* (convex part 32*a*1 provided on the bottom surface 32*a* of the recessed part 32 and protruding toward the bracket 50, see FIG. 4) of the recessed part 32 and elastically deformed. Similarly, the extension part 53 (curved part $C_{54a}$) is elastically deformed in a state where the protruding part 52 is inserted into the groove 33 as described above and the extension part 53 is detachably fixed to the attachment partner 80.

At this time, the protruding part 52 is fixed in a state of being biased (pressed) and locked to the first protruding part 33*a* (inner wall of the groove 33) on the front surface side by the reaction force (elastic force) of the spring part 54 (54*a* and 54*b*) elastically deformed as described above and the reaction force (elastic force) of the extension part 53 (curved part $C_{54a}$) elastically deformed as described above (see an enlarged view in a circle C1 in FIG. 4). As a result, the bracket attachment structure in which a positional shift of the bracket 50 with respect to the outer lens 30 is less likely to occur even when vibration (vibration mainly during running of vehicle) is applied is realized. In addition, when a load (excessive load) is applied, the load can be dispersed (buffered) by the plurality of spring parts 54*a* and 54*b*. As a result, it is possible to prevent a load (excessive load) from being applied to the radar unit 70 attached to the bracket 50, and it is possible to prevent the radar unit 70 from being damaged.

As described above, the bracket 50 is detachably attached to the outer lens 30 (recessed part 32).

The reason why the upper side (for example, the protruding part 52) of the bracket 50 (bracket main body 51) is not screwed to the outer lens 30 side is that it is difficult to secure a space for arranging the screw boss and the bracket fixing screw screwed thereto in the recessed part 32 of the outer lens 30.

Next, the radar cover 60 will be described.

The radar cover 60 (see FIG. 10) is detachably attached to the bracket 50 (bracket main body 51). For example, the radar cover 60 is detachably attached to the bracket 50 by engaging a hook part 56 (see FIG. 10) or the like provided in the bracket 50 with a protruding part 61 (see FIG. 10) or the like provided in the radar cover 60.

Next, the radar unit 70 will be described.

Figure 10:
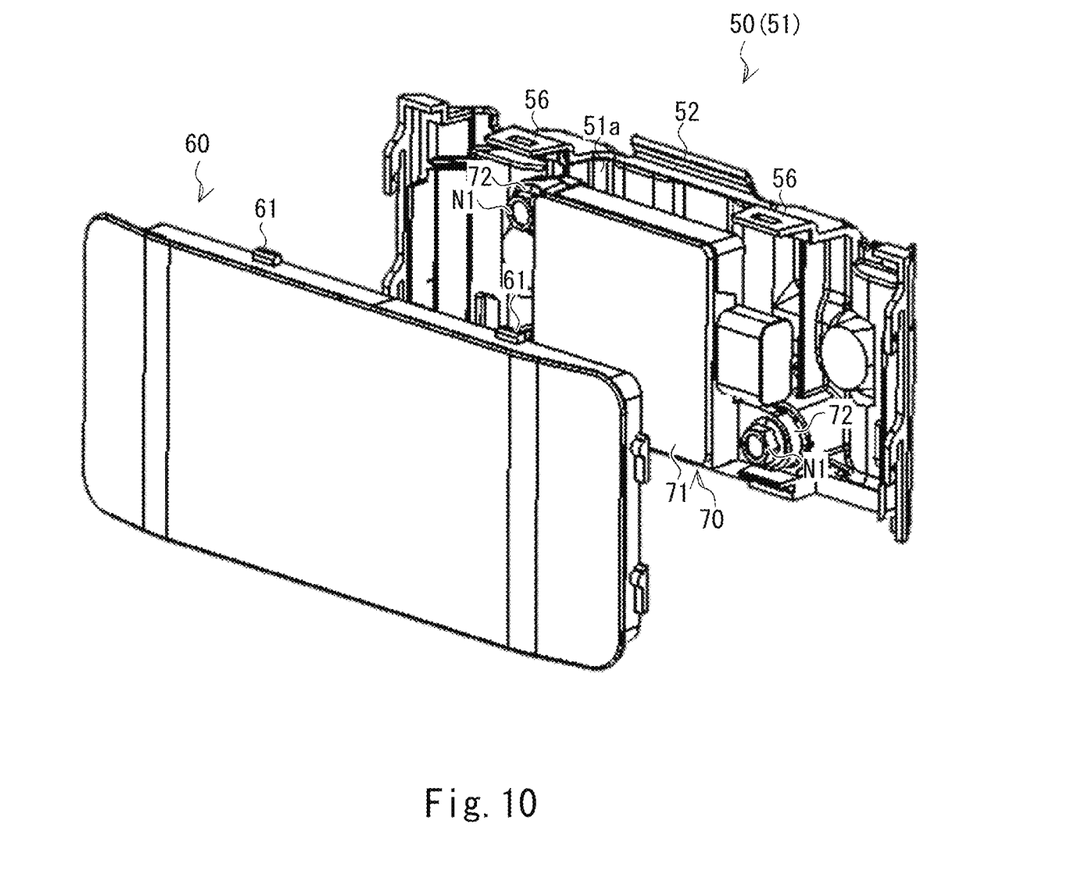
FIG. 10 is an enlarged perspective view of the bracket 50 and a radar cover 60.

As illustrated in FIG. 10, the radar unit 70 (radar device) includes a case 71, a transmission antenna, a reception antenna (both not illustrated), and the like housed in the case 71. The radar unit 70 is a millimeter wave radar unit that transmits an electromagnetic wave (millimeter wave) from a transmission antenna. The electromagnetic wave (millimeter wave) transmits through the radar cover 60 and is transmitted within a range of a vertical divergence angle $\theta_V$ (see FIG. 5) and a horizontal divergence angle $\theta_H$ (see FIG. 3). Then, the radar unit 70 receives, by the receiving antenna, the reflected wave reflected by the object present within the transmission range and transmitted through the radar cover 60. The received signal is subjected to signal processing by a control device, for example, an electronic control unit (ECU) not illustrated, and an object (distance, angle, speed from target object) is detected. In the radar unit 70, for example, a millimeter wave in a 76-81 GHz band, particularly, a millimeter wave in a 79 GHZ band is used, but the frequency band is not limited thereto.

Note that the radar method of the radar unit 70 may be any of a pulse method and a continuous wave (CW) method, or may be other methods. In addition, the antenna method of the radar unit 70 may be any of a mechanical scanning method, a beam switching method, a phased array method, and a digital forming method, or may be other methods.

The radar unit 70 having the above configuration is detachably attached to the bracket 50 (bracket main body 51). Specifically, as illustrated in FIG. 10, the radar unit 70 is attached to the bracket 50 (bracket main body 51) by screwing a screw N1 inserted into the flange part 72 of the radar unit 70 into a screw boss 51*a*1 of the radar unit attachment surface 51*a* of the bracket 50 in a state where the rear surface of the radar unit and the radar unit attachment surface 51*a* of the bracket 50 face each other. FIG. 10 is an enlarged perspective view of the bracket 50 and the radar cover 60.

As described above, according to the present embodiment, it is possible to provide the bracket attachment structure in which the bracket 50 to which the radar unit 70 (and the radar cover 60) is attached is detachably attached to the outer lens 30.

This is because the protruding part 52 which is fixed in a state of being biased and locked to the first protruding part 33*a* (inner wall of the groove 33) on the front surface side (see an enlarged view in a circle C1 in FIG. 4) by a reaction force (elastic force) or the like of the spring part 54 (54*a* and 54*b*) elastically deformed as described above, and the extension part 53 which extends downward from the lower portion side of the bracket main body 51 and is detachably fixed (for example, screw fixing) to the attachment partner 80 outside the recessed part 32 are provided (when the elastically deformable U-shaped curved part $C_{53}$ (second spring part) is omitted). Thus, the bracket 50 can be detachably and firmly attached to the outer lens 30 (recessed part 32) without using screws or the like. As a result, the bracket attachment structure in which a positional shift of the bracket 50 with respect to the outer lens 30 is less likely to occur even when vibration (vibration mainly during running of vehicle) is applied is realized. In addition, when a load (excessive load) is applied, the load can be dispersed (buffered) by the plurality of spring parts 54*a* and 54*b*. As a result, it is possible to prevent a load (excessive load) from being applied to the radar unit 70 attached to the bracket 50, and it is possible to prevent the radar unit 70 from being damaged.

Further, according to the present embodiment, due to the reaction force (elastic force) of the extension part 53 (curved part $C_{54a}$) elastically deformed as described above, the protruding part 52 is further biased by the first protruding part 33*a* (inner wall of the groove 33) on the front surface side and fixed in a state of being more firmly locked (when the elastically deformable U-shaped curved part $C_{53}$ (second spring part) is provided). Thus, the bracket 50 can be detachably and more firmly attached to the outer lens 30 (recessed part 32) without using screws or the like. As a result, the bracket attachment structure is realized in which the positional shift of the bracket 50 with respect to the outer lens 30 is further less likely to occur even when vibration (vibration mainly during running of vehicle) is applied. In addition, by providing the elastically deformable U-shaped curved part $C_{53}$ (second spring part) in addition to the spring part (first spring part) 54, a large reaction force (elastic force) can be obtained even when the number of spring parts 54 is reduced. As a result, the bracket 50 can be downsized.

Next, a modified example will be described.

In the above embodiment, an example has been described in which one extension part 53 extending downward from the lower side of the bracket main body 51 via the elastically deformable U-shaped curved part $C_{53}$ is used, but the present invention is not limited thereto.

Figure 11A:
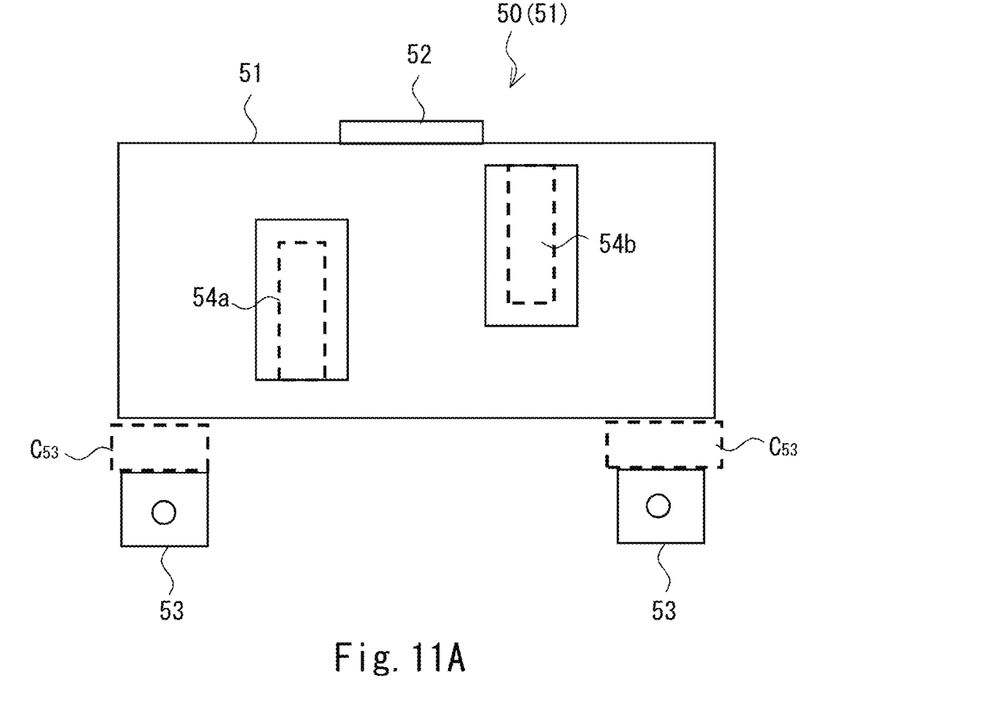
FIG. 11A is a first modified example of the bracket 50.

For example, as illustrated in FIG. 11A, a plurality of extension parts 53 may be used. FIG. 11A is a first modified example of the bracket 50.

Figure 11B:
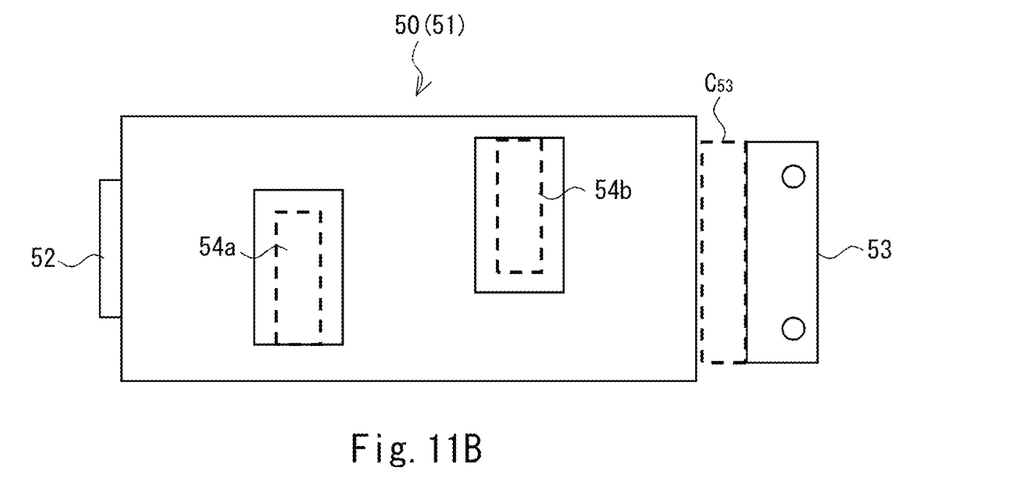
FIG. 11B is a second modified example of the bracket 50.

In the above embodiment, an example has been described in which the groove 33 is formed in the inner wall 32*b* (upper inner wall 32*b*1) of the recessed part 32, and the protruding part 52 inserted into the groove 33 is provided on the upper side of the bracket main body 51, but the present invention is not limited thereto. For example, a groove 33 may be formed in the inner wall 32*b* (inner inner wall 32*b*3) of the recessed part 32 (not illustrated), and as illustrated in FIG. 11B, a protruding part 52 to be inserted into the groove 33 may be provided on the bracket main body 51 at an inner side in the vehicle width direction. FIG. 11B illustrates a second modified example of the bracket 50.

In the above embodiment, an example has been described in which the groove 33 (an example of the engaged part in the present disclosure) is provided on the inner wall 32*b* (the upper inner wall 32*b*1) of the recessed part 32, and the protruding part 52 (an example of the engaging part in the present disclosure) to be inserted (engaged) into the groove 33 is provided on one end side of the bracket main body 51, but the present disclosure is not limited thereto. Although not illustrated, conversely, the protruding part 52 (an example of the engaging part of the present disclosure) may be provided on the inner wall 32*b* (the upper inner wall 32*b*1) of the recessed part 32, and the groove 33 (an example of the engaged part of the present disclosure) into which the protruding part 52 is inserted (engaged) may be provided on one end side of the bracket main body 51.

Each numerical value illustrated in each of the above embodiments is an example, and it is a matter of course that an appropriate numerical value different from this can be used.

Each of the above embodiments is merely an example in all respects. The present disclosure is not to be construed as being limited by the description of each of the above embodiments. The present disclosure can be implemented in various other forms without departing from the spirit or main characteristics thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A bracket attachment structure that detachably attaches a bracket to an outer lens that is attached to a lamp housing and constitutes a lamp chamber in which a lamp unit is disposed between the outer lens and the lamp housing, wherein
   the outer lens includes a recessed part recessed toward the lamp housing side,
   the bracket includes: a bracket main body including a front surface to which a radar unit is detachably attached and a rear surface on a side opposite to a the front surface, the bracket main body being disposed in the recessed part in a state where the rear surface and a bottom surface of the recessed part face each other; an extension part extending from an other end side on a side opposite to one end side of the bracket main body to an outside of the recessed part, and detachably fixed to an attachment partner; and at least one spring part arranged between the rear surface of the bracket main body and the bottom surface of the recessed part,
   an engaged part is provided in one of an inner wall of the recessed part and the one end side of the bracket main body,
   an engaging part that engages with the engaged part is provided in the other of the inner wall of the recessed part and the one end side of the bracket main body,
   the spring part is elastically deformed by being biased toward the bracket main body by the bottom surface of the recessed part in a state where the engaging part is engaged with the engaged part and the extension part is detachably fixed to the attachment partner, and
   the engaging part is engaged with the engaged part by a reaction force of the elastically deformed spring part.

2. The bracket attachment structure according to claim 1, wherein the spring part is formed integrally with the bracket main body by forming, in the bracket main body, a U-shaped through hole penetrating the front surface and the rear surface.

3. The bracket attachment structure according to claim 1, wherein
   the extension part is configured to be elastically deformed in a state where the engaging part is engaged with the engaged part and the extension part is detachably fixed to the attachment partner, and
   the engaging part is engaged with the engaged part by the reaction force of the elastically deformed spring part and a reaction force of the elastically deformed extension part.

4. The bracket attachment structure according to claim 3, wherein the extension part includes a curved part having a U-shaped cross section.

5. The bracket attachment structure according to claim 1, wherein the bracket main body, the engaging part, the extension part, and the spring part are integrally molded using a synthetic resin having a spring property.

6. The bracket attachment structure according to claim 1, wherein the engaged part is a groove,
the engaging part is a protruding part to be inserted into the groove, and
the protruding part is fixed in a state of being biased and locked to an inner wall of the groove by the reaction force of the elastically deformed spring part.

* * * * *

UNITED STATES PATENT AND TRADEMARK OFFICE
CERTIFICATE OF CORRECTION

| | |
|---|---|
| PATENT NO. | : 12,434,619 B2 |
| APPLICATION NO. | : 18/785907 |
| DATED | : October 7, 2025 |
| INVENTOR(S) | : Takehiro Matsumoto et al. |

Page 1 of 1

It is certified that error appears in the above-identified patent and that said Letters Patent is hereby corrected as shown below:

On the Title Page

Item (73) Assignee, Line 2, add the second assignee "HONDA MOTOR CO., LTD., Tokyo (JP)"

Signed and Sealed this
Twenty-third Day of December, 2025

John A. Squires
*Director of the United States Patent and Trademark Office*